3,410,913
ALCOHOL MANUFACTURE
Matthew A. McMahon, Jr., Wappingers Falls, and Harry Chafetz, Poughkeepsie, N.Y., assignors to Texaco Inc., New York, N.Y., a corporation of Delaware
No Drawing. Filed Nov. 26, 1965, Ser. No. 510,073
4 Claims. (Cl. 260—632)

ABSTRACT OF THE DISCLOSURE

Method of producing secondary alkanols from n-paraffins comprising contacting said n-paraffins with an oxygen containing gas in the presence of trialkoxyboroxine, oxybis(dialkoxyborane) and mixtures thereof, subsequently hydrolyzing the resultant mixture, and recovering secondary alkanols therefrom.

---

This invention relates to the production of alcohols from hydrocarbons. More particularly, it pertains to the oxidative conversion of predominantly straight chain paraffinic hydrocarbons to secondary alkanols in the presence of a borate ester anhydride selected from the group consisting of trialkoxyboroxine, oxybis(dialkoxyborane) and mixtures thereof of the formulas:

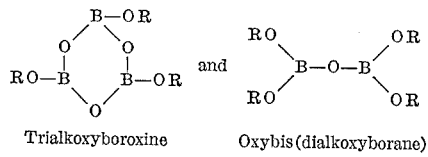

Trialkoxyboroxine          Oxybis(dialkoxyborane)

where R is primary alkyl, secondary alkyl or cycloalkyl hydrocarbon of from 3 to 20 carbons, preferably from 3 to 6 carbons.

In the past, secondary alkanols have been manufactured from normal paraffins via catalytic oxidation utilizing known oxidation catalysts such as potassium permanganate. Although potassium permanganate is effective in promoting the conversion of the paraffins into secondary alkanols, it is not particularly satisfactory for secondary alkanol manufacture in that it also promotes the production of substantial quantities of undesired organic oxidates such as ketones, carboxylic acids and aldehydes.

We have discovered, and this constitutes our invention, a novel oxidative process for the production of secondary alkanols from normal (n) paraffinic hydrocarbons utilizing novel borate esters anhydride oxidation directors for said process which outstandingly promote the production of secondary alkanols without the production of an over abundance of other undesired oxidates. This invention is emphasized in the fact than many boron compounds closely related to the ester anhydride contemplated herein such as orthoboric acid and trialkylborate when substituted for the contemplated oxidation directors in the method of this invention either inhibit the production of the secondary alkanol or at the very best are substantially less effective in directiing the oxidation toward the goal of secondary alkanol manufacture.

By the terms "normal paraffins" and "predominantly straight chain hydrocarbons" we intend to include, in addition to the pure straight chain alkanes, paraffinic hydrocarbon mixture which contain a minor amount, that is, less than 50 wt. percent of secondary and tertiary paraffins, e.g., as well as impurity amounts, that is, less than about 1.0 wt. percent of aromatic hydrocarbons.

Specifically, the method of invention, that is, the method of preparing secondary alkanols from n-paraffins, comprises first contacting, preferably under conditions of agitation, an n-paraffin having between about 6 and 40 carbons with oxygen in the presence of between about 1 and 30 wt. percent based on the n-paraffin charge of the borate ester anhydride as previously defined. The reaction is conducted at a temperature between about 150 and 200° C. under a pressure of between about 0 and 100 p.s.i.g. The exact pressure employed is determined by the factor that it should be sufficient to prevent the premature escape from the reactor of the paraffin reactant, borate ester anhydride, desired product and product precursor. Under advantageous conditions the rate of oxygen contact with the paraffin is between about .05 and 1 liter $O_2$/minute/kg. of paraffin charge which is equivalent to between about 0.25 and 5 liters of air/min./kg. of paraffin charge. Also under the preferred conditions the oxygen contact is conducted under essentially anhydrous conditions, i.e., any water byproduct is removed as formed. Under the reaction conditions whether batch or continuous the period of paraffin-borate ester anhydride-oxygen contact normally averages between 0.5 and 10 hours.

The oxidized reaction mixture from the aforedescribed first stage reaction is then contacted with water at a temperature between about 25 and 100° C., preferably under agitation conditions, and advantageously in a weight ratio of water to oxidized mixture of between about 1:3 to 3:1. Normally, the period of aqueos contact is from 0.1 to 10 hours. Under preferred conditions the aqueous contacting is first preceded by a separation, e.g., fractional distillation treatment, of the oxidized first reaction mixture in order to remove unreacted paraffin and volatile byproducts from said mixture. The fractional distillation provides for a purer final secondary alkanol product. In any case, the water treated oxidized reaction mixture is allowed to separate into two phases, that is an organic phase and an aqueous phase. The organic phase is separated from the aqeuous phase by standard means, e.g., decantation, and the secondary alkanol product found in said organic phase is in turn separated from said organic phase by standard means such as fractional distillation (reduced pressure if necessary). Under preferred conditions prior to the recovery of the secondary alkanol from the separated organic layer, the separated organic layer is subjected to a standard saponification treatment, e.g., with an aqueous or alcoholic solution of alkali metal hydroxide (between about 5 and 40 wt. percent hydroxide) advantageously in a weight ratio of said solution to said organic layer of between about 1:3 and 3:1 at between about 25 and 100° C. The saponified organic layer is isolated by standard means (e.g., decantation) and then subjected to fractional distillation under reduced pressure (if necessary) to recover the secondary alkanol product.

The is theorized that in the first stage of the foregoing process, namely, the oxidation stage a borate ester anhydride-paraffinic oxidate compound is formed and in the second stage of the reaction, namely, the water treatment stage, the water hydrolyzes said compound in a manner to generate the secondary alkanol by decomposing said compound and hydrolyzing the secondary alkanol precursor to the desired secondary alkonal product. The saponification step is for the purpose of separating out readily saponifiable material such as carboxylic acids from the essentially nonsaponifiable second alkanol product.

It is to be noted in the above method of the invention secondary alkanol is produced as opposed to primary alkanol since the $CH_2$ groups in the n-paraffins are substantially more susceptible to oxidation in the method of the invention than the terminal $CH_3$ group. Further, the particular $CH_2$ group of the paraffin reactant which is affected in the oxidation step, is a random choice of the oxidation reaction, therefore, the final secondary alkanol product is essentially always a mixture of secondary alkanols. Therefore by the term "secondary alkanol" we intend to include mixtures thereof.

It is preferred to employ nonmetallic or nonmetallic lined equipment in the oxidation step since it appears that metals such as iron, cobalt and nickel tend to poison the reaction and/or at least direct the reaction to oxygenated products other than secondary alkanols such as ketones. Examples of such nonmetallic equipment are glass lined stainless steel reactors.

Examples of the secondary alcohol produced in the overall method of the invention are secondary dodecanol from n-dodecane; a mixture of sec-undecanol, sec-dodecanol, sec-tridecanol and sec-tetradecanol from $C_{11}$–$C_{14}$ n-paraffins and sec-octadecanol from n-octadecane. It is to be noted the secondary alkanols are mixtures of alkanols since the oxidation of the n-paraffin takes place at random in respect to the $CH_2$ group in said paraffin.

The paraffinic reactant employed may be any of the known normal paraffins having about 6 to 40 carbons and mixtures thereof. As heretofore stated the paraffin reactant may also contain a minor amount of isoparaffins, tertiary paraffins and an impurity amount of aromatic hydrocarbons. Specific examples of the normal paraffins contemplated are n-nonane, n-decane, n-undecane, n-dodecane, n-tridecane, tetradecane, n-pentadecane, n-hexadecane, and mixtures of n-decane, n-undecane, n-dodecane and n-tridecane.

Oxygen is preferably utilized in the method of invention in the form of an oxygen containing gas such as air, however, oxygen either alone or in combination with an inert gas such as oxygen-nitrogen combination may be also employed.

As heretofore stated, the oxidation director in the method of invention is a borate ester anhydride selected from the group consisting of trialkoxyboroxine, oxybis(dialkoxyborane) and mixtures thereof of the general formulas:

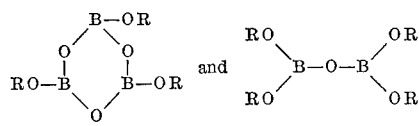

where R is primary alkyl, secondary alkyl or cycloalkyl of from 3 to 20 carbons, preferably an n-alkyl of from 3 to 6 carbons. Under the preferred conditions of the method of invention, the oxidation director employed is one that is soluble in the particular n-paraffin to be oxidized. It is to be noted when R is tertiary alkyl in the aforedescribed borate ester anhydride, the anhydride is predictably ineffective as an oxidation director in promoting secondary alcohol manufacture in the method of the invention.

The borate ester anhydride oxidation director is prepared by reacting an n-alkanol, sec-alkanol or a cycloalkanol of from 3 to 20 carbons with an inorganic boron compound selected from the group consisting of orthoboric ($H_3BO_3$) acid, metaboric acid ($HBO_2$) and boric oxide ($B_2O_3$) in a mole ratio of alkanol to inorganic boron compound of between about 1:1 and 2:1 at a temperature below about 140° C., preferably between 120 and 130° C., for a first period of time (e.g. between about 1 and 10 hours) and then subsequently raising the temperature to between about 160 and 200° C. for a second period of time (e.g., between about 1 and 5 hours). In any case said second period of time should last at least until substantially the theoretical amount of water byproduct of reaction has been removed.

In the aforedescribed preparation of the borate ester anhydride when the reactant is orthoboric acid, a 1:1 mole ratio of alkanol to orthoboric acid favors the production of trialkoxyboroxine while the mole ratio of 2:1 alcohol to orthoboric acid favors the production of oxybis(dialkoxyborane). On the other hand, when boric anhydride is employed in the preparation of the oxidation director a mole ratio of 2:1 alcohol to boric anhydride produces the trialkoxyboroxine. Intermediate mole ratios favor mixtures of the boroxine and oxyborane. The criticality of maintaining the ratio of inorganic boron compound to alkanol within the prescribed ranges in the ester anhydride reaction can be seen from the fact that a mole ratio of 1:3 of boric acid to alkanol will produce trialkylborate of the general formula $(RO)_3B$ which in the method of the invention appears to inhibit the production of secondary alkanol.

Examples of alcohols employed in the manufacture of borate ester anhydrides are n-butanol, n-hexanol, n-dodecanol, a mixture of $C_9$ to $C_{14}$ n-alkanols, cyclohexanol and pentane-3-ol.

Specific examples of the boroon ester anhydride oxidation directors contemplated herein are tri-n-butoxyboroxine, tri-n-hexoxyboroxine, tricyclohexoxyboroxine and trialkoxyboroxine mixtures such as mixtures of tri-n-undecoxyboroxine, tri-n-dodecoxyboroxine and tri-n-tridecoxyboroxine. Examples of the oxyborane oxidation directors are oxybis(dibutoxyborane), oxybis(didodecoxyborane), oxybis(diethylhexoxyborane) and oxybis(dioctylpentoxyborane).

In regard to the preference of having the alkyl groups of the borate ester anhydride of between 3 and 6 carbons, borate ester anhydride having alkyl groups less than 3 carbons are undesirably unstable in the method of the invention and tend to clog the equipment. Further, and more important, they decompose into the undesirable trialkylborate. Still further, in respect to the upper limitation of 20 carbon atoms, the oxygen reactant in the method of the invention tends to attack the alkyl groups, and therefore, the larger the alkyl groups the more $CH_2$ radical present to compete for the oxygen present in the system. Thus, the alkyl groups having between 3 and 6 carbons are preferred.

Specific examples of saponification agents are aqueous sodium hydroxide and aqueous potassium hydroxide and ethanol-sodium hydroxide solution.

The following examples further illustrate the invention but are not to be construed as limitations thereof.

EXAMPLE I

This example illustrates the preparation of the oxidation direction, tri-n-butoxyboroxine.

To a reactor equipped with a stirrer, thermometer, water cooled condenser and a trap, there were added 175 grams (2.36 moles this includes 25 grams excess that remains in the trap at the end of the reaction) of n-butyl alcohol and 124 grams (2 moles) orthoboric acid. The mixture was stirred and heated for 3 hours at 100–130° C. and then the temperature was raised to 160° C. over a period of 2 hours until water ceased to evolve. About 64 mls. of water was collected and the product was shown to be tri-n-butoxyboroxine.

EXAMPLE II

This example illustrates the preparation of the oxidation director, tri-n-dodecoxyboroxine.

To a reactor equipped with stirrer, thermometer, water cooled condenser and a trap there were added 372 grams (2 moles) of n-dodecyl alcohol and 124 grams (2 moles) of orthoboric acid. This mixture was heated at 100–130° C. for 1.5 hours and the reaction was maintained at 200° C. until water ceased to evolve. The total water collected from this reaction weighed 57 grams. The residue was an oil solid and was indicated as tri-n-dodecoxyboroxine.

EXAMPLE III

This example illustrates the preparation of the oxidation director, tricyclohexoxyboroxine.

To a reactor equipped with stirrer, thermometer, trap and water cooled condenser there were added 100 g. (1 mole) of cyclohexanol, 60 g. (1 mole) of orthoboric acid and 120 g. toluene (azeotroping agent). This mixture was heated at 100–120° C. for 3 hours and then heated to 175° C. for a period of 2 hours. A total of 36 g. of water and 125 mls. of toluene were distilled from the mixture. The white powdery residue was indicated as tricyclohexoxyboroxine.

EXAMPLE IV

This example illustrates the preparation of the oxidation director oxybis(dibutoxyborane).

A mixture of 62 grames (1 mole) of boric acid and 148 grams (2 moles) of n-butanol were charged to a 500 mls. flask equipped with a magnetic stirrer, thermometer and 6 inch helix-packed column. The mixture was heated in the range of 110 to 122° C. until 29 ml. of water was collected from the distillate. All of the butanol layer in the distillate was recycled back to the reactor pot. The mixture was then heated at 121–138° C. until a total of 39 mls. of water was collected. The residue in the pot was indicated to be oxybis(dibutoxyborane) of the general formula:

$$[(n-C_4H_9O)_2B]_2O$$

EXAMPLE V

This example illustrates the preparation of a tributylborate which is utilized for comparative purposes in respect to the oxidation directors contemplated in the method of the invention.

A mixture of 62 grams (1 mole) of boric acid and 222 grams (3 moles) of n-butanol was charged to a 500 mls. flask equipped with a magnetic stirrer, thermometer and an 8-inch helix-packed column. This mixture was heated at 100–142° C. until 51 mls. of water was distilled from the mixture. As a butanol-water azeotrope, the butanol layer of the distillate was continually recycled back to the reactor pot during the course of the reaction. The residue was indicated tri-n-butylborate of the formula $$(n-C_4H_9O)_3B$$

EXAMPLE VI

This example illustrates the procedure of the invention, namely, the conversion of n-dodecane into secondary dodecanol.

The runs described in the following sub examples were conducted in a one liter glass reactor. The reactor was equipped with a stirring device, a water separator, a thermometer, a gas sparger for the introduction of the required air and was further equipped with water cooled and Dry Ice cooled traps connected in series of condense entranced water and organic materials from the effluent gas. The paraffin reactant (n-dodecane) and oxidation director were charged to the reactor and the mixture was heated followed by the introduction of air therethrough via the sparger while the mixture was stirred vigorously. The reaction was continued until the desired amount of paraffin was converted. In case of runs where boric acid is included in the reaction mixture, the reaction mixture prior to contact with oxygen was heated to between 120 and 175° C. while nitrogen was passed through the mixture until the amount of water evolved from the mixture was equivalent in moles to the amount of boric acid charged. In the reaction where no boric acid was added the dehydration step was not done.

At the end of the initial (oxidation) reaction period the unreacted paraffins along with the ketones and the volatile byproducts formed in the reaction were distilled from the reaction mixture under reduced pressure, e.g., 190° C. at 5 mm. Hg. Precautions were taken to minimize the contact of the reaction mixture with the atmospheric moisture in order to prevent premature hydrolysis.

The residual mixture, subsequent to distillation, was then contacted under mixing conditions with water at 100° C. for a period of three minutes to 1 hour utilizing equal quantities on a weight basis of water and residual oxidized reaction mixture. The resultant organic layer was then separated from the aqueous layer and the organic layer was treated with an equal amount on a weight basis of 20 wt. percent aqueous sodium hydroxide for 3 hours at 100° C. The resultant saponified organic layer was separated from the saponified mixture and subjected to fractional distillation at reduced pressure to recover sec-dodecanol. During the oxidation reaction aliquots were periodically withdrawn from the reaction mixture, and after hydrolysis and saponification analyzed by means of gas chromatography. The amounts of alcohols and ketones in the recovered product were determined by standard titration methods. The specific runs and results are reported in the following sub examples.

EXAMPLE VI–a

Two runs were made utilizing 200 g. of n-dodecane as the paraffin reactant, 34 grams of tri-n-dodecoxyboroxine as the oxidation director, and an oxidation temperature of 175° C. In Run A below air was employed as the oxidizing medium at a rate of 300 mls./minute and in Run B below the oxidizing medium was a 1:1 volume mixture of air:$N_2$ introduced at a rate of 300 mls./minute. The results are reported below in Table I:

TABLE I

| Run No. | Oxidation Time, Hrs. | Yield Sec-Dodecanol,* Wt. Percent | Sec-Dodecanol/ $C_{12}$ Alkanone |
|---|---|---|---|
| A | 0.5 | 5.3 | 28 |
|   | 1.0 | 10.1 | 15 |
| B | 3 | 2.9 | 41 |
|   | 4 | 9.1 | 17.8 |
|   | 5 | 11.9 | 8.0 |
|   | 7 | 15 | 4.8 |

*Based on hydrolyzed reaction mixture.

EXAMPLE VI–b

Three runs were made utilizing 200 grams of n-dodecane as the paraffin reactant and 22.8 grams of tricyclohexoxyboroxine as the oxidation director. In the oxidation phase of the reaction Runs C and D were conducted at 175° C. and Run E was conducted at 175° C. for the the first three hours and then at 195° C. for the subsequent 2.5 hours. The test data and product yield results are reported below in Table II:

TABLE II

| Run No. | Air Rate, mls./min. | Oxidation Time, Hrs. | $C_{12}$ Alkanol,* Wt. Percent | $C_{12}$ Alkanol/ $C_{12}$ Alkanone |
|---|---|---|---|---|
| C | 150 | 8 | 4.4 | |
|   |     | 9 | 10.6 | 11.8 |
|   |     | 10 | 14.1 | 8.8 |
|   |     | 11 | 17.1 | 3.2 |
| D | 500 | 4 | 13.4 | 7.9 |
|   |     | 5 | 15.7 | 4.6 |
| E | 110 | 3 / 2.5 | 14.6 | 14.6 |

*Based on hydrolyzed reaction mixture.

EXAMPLE VI–c

This example illustrates the preparation of secondary dodecanol from n-dodecane utilizing tri-n-butoxy-boroxine as the oxidation director and an oxidation temperature of 175° C. In addition to the runs utilizing these ingredients three control runs are included for comparative purposes, specifically Control Run F employs no oxidation director. Control Run G utilizes comparative tri-n-butylborate of the formula $(n-C_4H_9O)_3B$ as the oxidation director and Control Run H utilizes comparative orthoboric acid as the oxidation director. Runs I, J, K and L represent example runs of the method of the invention. Specifically, Runs I, J and K employ tributoxyboroxine and Run L employs oxybis(dibutoxyborane) as the oxidation director. The test data and results are reported below in Table III:

.05 and 1 liter oxygen/minute/kilogram of said paraffin.

3. A method for producing an oxidate comprising con-

TABLE III

| Run No. | Ox. Direct.[1] | Grams | n-Dodecane, g. | Air Rate, mls./min. | Ox. Time, Hrs. | Yield Sec-$C_{12}H_{25}OH$,[2] Wt. Percent | Yield Sec-$C_{12}H_{25}OH$/ $C_{12}$ Alkanone |
|---|---|---|---|---|---|---|---|
| F | None | | 200 | 300 | 0.5 | 2.2 | |
| | | | | | 1.5 | 4.4 | |
| | | | | | 5.0 | 8.2 | 16 |
| G | $(RO)_3B$ | 37 | 100 | 150 | 0.5 | 1.7 | 2.1 |
| | | | | | 1.0 | 2.2 | 2.9 |
| | | | | | 1.5 | 4.1 | 3.1 |
| H | $H_3BO_3$ | 10 | 200 | 250 | 1 | | 10 |
| | | | | | 4 | | 6.3 |
| | | | | | 6.5 | | 2.9 |
| I | $(ROBO)_3$ | 16 | 200 | 300 | 0.75 | 5 | 17 |
| | | | | | 1.25 | 12.8 | 14 |
| J | $(ROBO)_3$ | 16 | 200 | 300 | 0.5 | 2.7 | |
| | | | | | 1.0 | 7.1 | 26 |
| | | 8 | | | 1.5 | 13.4 | 35 |
| | | | | | 2.0 | 16.0 | 27 |
| | | 8 | | | 2.5 | 16.5 | 18 |
| | | | | | 3.0 | 19 | 18 |
| K | $(ROBO)_3$ | 16 | 200 | 300 | 0.5 | 2.6 | 51 |
| | | | | | 1.0 | 5.5 | 32 |
| | | | | | 1.5 | 9.2 | 28 |
| | | 16 | | | 2.0 | 12.0 | 24 |
| | | | | | 2.5 | 14.0 | 28 |
| | | | | | 3.0 | 15.3 | 22 |
| L | $[(RO)_2B]_2O$ | 26 | 100 | 150 | 0.5 | 2.5 | 75 |
| | | | | | 1.0 | 5.6 | 28 |
| | | | | | 1.5 | 9.6 | 16 |

[1] R-n butyl.   [2] Based on hydrolyzed reaction mixture.

As can be seen from the above Table III, the runs utilizing the oxidation directors contemplated by the invention produce substantially a greater amount of secondary alkanol or at least a greater proportion of secondary alkanol to ketone than the runs employing either no oxidation director or orthoboric acid and trialkylborate. Further, as can be seen trialkylborate appears to actually inhibit the production of secondary dodecanol.

We claim:
1. The method of producing an oxidate comprising contacting an n-paraffin of from 6 to 40 carbons with oxygen in the presence of a borate ester anhydride of the formula

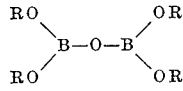

where R is a primary alkyl of from 3 to 20 carbons at a temperature between about 150 and 200° C., said borate ester anhydride being present in an amount of between about 1 and 30 wt. percent based on said paraffin.

2. A method of producing an oxidate comprising contacting an n-paraffin of from 6 to 40 carbons with oxygen in the presence of a borate ester anhydride of the formula

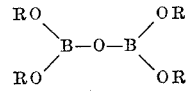

where R is a primary alkyl of from 3 to 20 carbons, at a temperature between about 150 and 200° C., said borate ester anhydride being present in an amount of between about 1 and 30 wt. percent based on said paraffin, said oxygen contacting conducted at a rate of between about .05 and 1 liter oxygen/minute/kilogram of said paraffin.

3. A method for producing an oxidate comprising contacting an n-paraffin of from 6 to 40 carbons with air in the presence of a boron ester anhydride of the formula

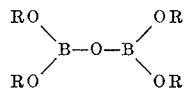

where R is an n-alkyl hydrocarbon from 3 to 6 carbons at a temperature between about 150 and 200° C. under essentially anhydrous conditions, said borate ester anhydride being present in an amount of between about 1 and 30 wt. percent based on said n-paraffin, said air contacting conducted at a rate between about 0.25 and 5 liters air/minute kilogram of said paraffin.

4. A method of producing secondary dodecanol comprising:
(a) first contacting n-dodecane with air in the presence of oxybis(dibutoxyborane) at a temperature between about 150 and 200° C. under essentially anhydrous conditions, said oxybis(dibutoxyborane) being present in an amount of between about 1 and 30 wt. percent based on said n-dodecane, said air contacting conducted at a rate between about 0.25 and 5 liters air/minute kilogram of said n-dodecane,
(b) removing from the resultant air contacted reaction mixture unreacted n-dodecane and volatile by-products,
(c) contacting the n-dodecane free mixture with water at a temperature of between about 25 and 100° C. in a weight ratio of water to said mixture of between about 1:3 and 3:1,
(d) recovering the resultant organic layer from the contacted reaction mixture,
(e) contacting said resultant organic layer with a saponification member selected from the group consisting of aqueous alkali metal hydroxide and alcoholic alkali metal hydroxide, at a temperature between about 25 and 100° C.,
(f) recovering the resultant organic layer, and
(g) recovering from said resultant organic layer said secondary dodecanol.

References Cited

UNITED STATES PATENTS

| | | | |
|---|---|---|---|
| 3,099,677 | 7/1963 | Hunter | 260—462 |
| 3,232,704 | 2/1966 | Helbig et al. | 260—617 |
| 3,243,449 | 3/1966 | Winnick | 260—632 |
| 3,257,455 | 6/1966 | Ashby | 260—462 |

FOREIGN PATENTS

| | | |
|---|---|---|
| 939,534 | 10/1963 | Great Britain. |
| 1,035,624 | 7/1966 | Great Britain. |
| 1,345,832 | 11/1963 | France. |

OTHER REFERENCES

Bashkirov et al.: "World Petr. Congress," 5th proceedings, New York, 1959, vol. 4, pp. 175–83.

BERNARD HELFIN, *Primary Examiner.*

J. E. EVANS, *Assistant Examiner.*